United States Patent [19]
Goetter

[11] Patent Number: 4,620,815
[45] Date of Patent: Nov. 4, 1986

[54] FASTENER STRIPS FOR SPLICE CASES

[75] Inventor: Erwin H. Goetter, Chesterland, Ohio

[73] Assignee: Preformed Line Products Company, Cleveland, Ohio

[21] Appl. No.: 744,783

[22] Filed: Jun. 14, 1985

Related U.S. Application Data

[62] Division of Ser. No. 591,943, Mar. 21, 1984, Pat. No. 4,549,040.

[51] Int. Cl.$^4$ ................................................. F16B 2/02
[52] U.S. Cl. .................................... 403/405.1; 24/459; 138/158; 174/92; 220/80; 403/344; 411/85
[58] Field of Search ................... 174/92; 24/279, 284, 24/459, 525, 569, 697, 701; 52/732; 138/156–160, 167; 220/80, 324, 325; 248/73, 222.4, 223.1, 223.2; 292/256.71, 256.73, 268; 403/405.1–408.1, 410, 312, 313, 344; 411/84, 85, 103, 107

[56] References Cited

U.S. PATENT DOCUMENTS

| | | | |
|---|---|---|---|
| 1,019,255 | 3/1912 | Ickes | 220/80 |
| 1,047,176 | 12/1912 | Crabtree et al. | 52/732 X |
| 1,079,445 | 11/1913 | Smith | 174/149 R |
| 1,276,312 | 8/1918 | Ballenberg | 403/407 |
| 2,299,158 | 10/1942 | Luce | 411/84 |
| 2,586,537 | 2/1952 | Hapman | 138/151 |
| 2,590,896 | 4/1952 | Seele | 301/9 |
| 2,853,113 | 9/1958 | Flora et al. | 411/103 |
| 3,279,838 | 10/1966 | Hamilton | 292/251 |
| 3,456,706 | 7/1969 | Ollis, Jr. | 411/84 |
| 3,511,000 | 5/1970 | Keuls | 52/732 X |
| 3,636,241 | 1/1972 | Baumgartner et al. | 174/92 |
| 3,663,740 | 5/1972 | Dellett | 174/92 |
| 3,692,926 | 9/1972 | Smith | 174/92 |
| 3,981,409 | 9/1976 | Flanders | 220/324 X |
| 4,095,044 | 6/1978 | Horsma et al. | 174/138 F |
| 4,262,167 | 4/1981 | Bossard et al. | 174/92 |
| 4,361,721 | 11/1982 | Massey | 174/92 |

FOREIGN PATENT DOCUMENTS 539542  9/1941  United Kingdom ............... 24/697

*Primary Examiner*—Laramie E. Askin
*Attorney, Agent, or Firm*—Fay, Sharpe, Fagan, Minnich & McKee

[57] ABSTRACT

A fastener strip arrangement for joining splice cases of the type including a pair of splice case members having outwardly extending flanges positioned in opposed cooperating relationships to define cooperating flange pairs on opposite sides of the splice case. The fastener strip arrangement comprises two elongated strips each of generally channel-shaped cross-section and including a web having legs projecting from opposite side edges thereof in the same direction. One leg of each strip projects from the web a shorter distance than the other leg. One of the strips has generally keyhole-shaped slots formed through the web to extend generally longitudinally thereof. The generally keyhole-shaped slots each have large opening areas and narrow opening areas, with the narrow opening areas lying closer to the short leg of the strip than to the long leg of the strip and with a substantially greater portion of each large opening area being located on the side of the narrow opening spaced toward the long leg. The other of the strips has bolt and nut assemblies with the bolts projecting from the web in the same direction as the legs and being located closer to the short leg than to the long leg.

6 Claims, 6 Drawing Figures

FASTENER STRIPS FOR SPLICE CASES

This is a divisional of co-pending application Ser. No. 591,943 filed on 3/21/84, now U.S. Pat. No. 4,549,040.

BACKGROUND OF THE INVENTION

This application relates to the art of housings and, more particularly, to fastener strips for clamping together cooperating pairs of flanges on a pair of opposed housing members. The invention is particularly applicable to housings of the type known as splice cases for cables or the like and will be described with specific reference thereto. However, it will be appreciated that the invention has broader applications and can be used for clamping together housings other than cable splice cases.

Cable splice cases of known types include a pair of splice case members having opposite flanges extending outwardly therefrom. The splice case members are positioned with their flanges in opposed cooperating relationship to define opposite pairs of cooperating flanges on the splice case. Suitable fasteners are then used for clamping together the cooperating pairs of flanges. Previous splice cases of this type used various arrangements for clamping together the cooperating pairs of flanges. In certain arrangements, a large number of loose fastener parts are required and this increases the amount of time required to assemble or disassemble the splice case. In certain arrangements of this type, fastener loads are not uniformly distributed along the cooperating flange pairs, and this results in flange distortion which reduces the life of the splice case members.

BRIEF SUMMARY OF THE INVENTION

The subject invention overcomes the noted problems and provides an improved fastener strip arrangement which facilitates clamping together housing members of the type described.

The fastener strips in accordance with the present application have a number of different novel and advantageous features. In one arrangement, each fastener strip has at least one longitudinal leg projecting therefrom and the fastener strips are positioned with such legs extending toward one another in opposed relationship. This arrangement stiffens the fastener strips and also provides uniform loading on the flanges in the areas engaged between the legs.

In a preferred arrangement, the fastener assemblies which clamp the fastener strips together include bolts attached adjacent one end portion thereof to one of the fastener strips and having an enlargement in the form of a nut or a bolt head on the opposite end portion thereof. The flanges have holes for passage of the enlargements therethrough and the other of the fastener strips in each pair has generally keyhole-shaped openings therethrough. The keyhole-shaped openings include a large area portion for free passage of an enlargement therethrough and a narrow area portion through which a said enlargement will not pass while being dimensioned for freely receiving the bolt. This arrangement greatly facilitates assembly and disassembly of the splice case because all of the fasteners are attached to one fastener strip at the factory. The fastener strip with the nuts and bolts assembled thereto is simply manipulated to extend the enlargements through the flange holes until the one fastener strip is positioned against an adjacent splice case flange. The other fastener strip is then simply moved against a cooperating flange by extending the fastener enlargements through the large area portions of the keyhole-shaped slots until the other fastener strip is adjacent a cooperating flange. The other fastener strip is then longitudinally shifted to position the bolts in the narrow area portions of the keyhole-shaped openings and to align the enlargements with the same areas. The bolt and nut assemblies are then tightened to securely clamp the cooperating pairs of flanges together between a pair of cooperating fastener strips.

In a preferred arrangement, the fastener strips are generally channel-shaped in cross-section and include a pair of longitudinal legs projecting therefrom in the same direction at opposite side edges of a web. One leg of each pair of legs on a fastener strip is substantially longer than the other leg to define short and long legs. The fastener strips are positioned with the long legs thereon located adjacent the outer free end portions of the flanges, while the short legs thereof are located adjacent the intersections of the flanges with the main body portions of the splice case members.

The bolts are preferably attached to their fastener strip substantially closer to the short leg than to the long leg. This arrangement provides a very high and uniform clamping force on the sealing areas located between the short legs of the fastener strips.

The individual fastener strips of the present application can be used in cooperation with different fastener strips and in joints other than those for splice cases. Likewise, the joint formed by the improved assembly of the present application can be used in environments other than splice cases.

A principal advantage of the invention is to provide improved fastener strips for clamping together cooperating flanges on opposed housing parts.

Another advantage of the invention is the provision of improved fastener strips for use in making joints between cooperating flanges on housing members.

Other advantages and benefits of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described herein and illustrated in the accompanying drawings which form a part hereof and wherein.

DETAILED DESCRIPTION OF A PREFERRED EMBODIMENT

Figure 1:
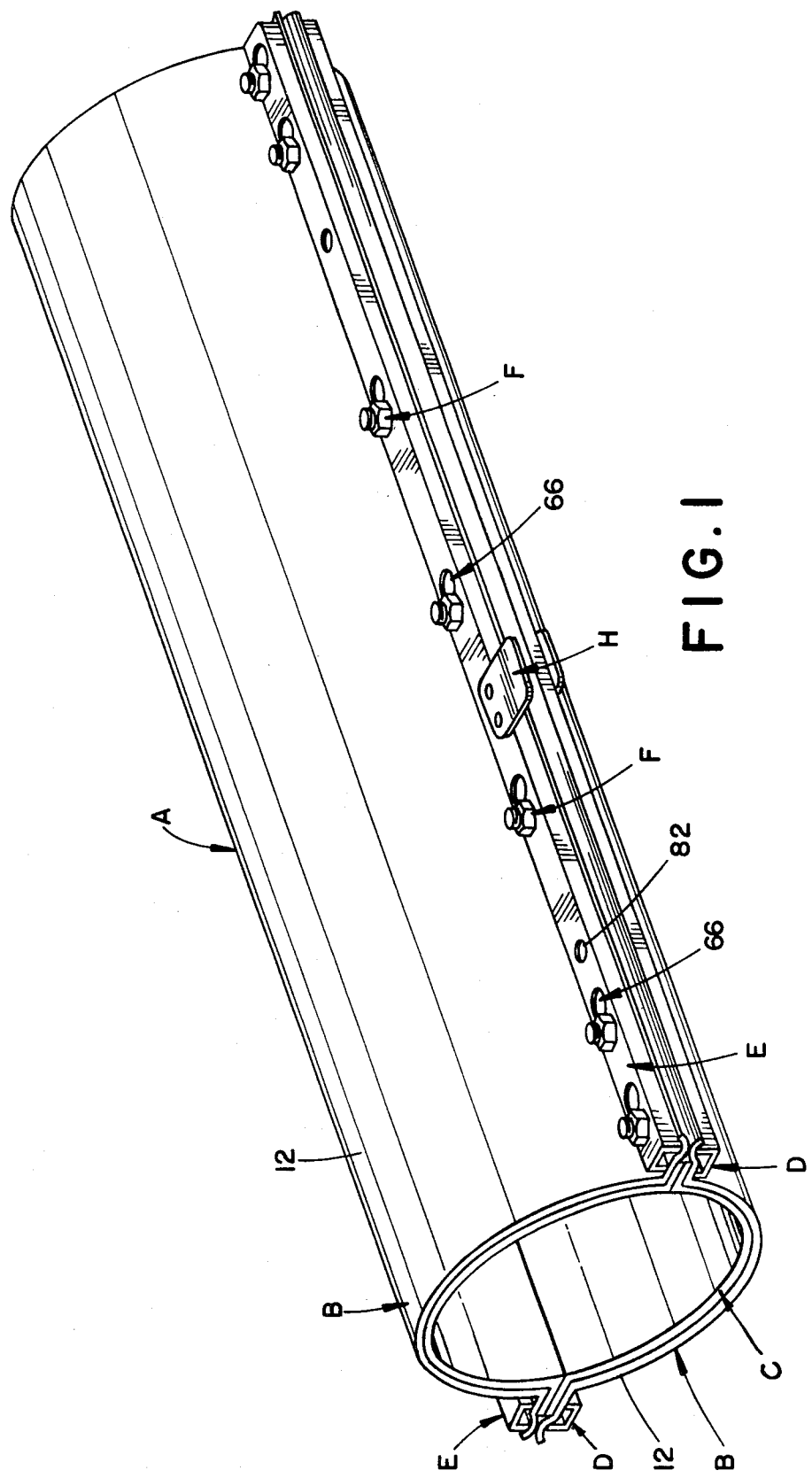
FIG. 1 is a perspective view of a splice case having the improvements of the present invention incorporated thereinto.

Referring now to the drawings, wherein the showings are for purposes of illustrating a preferred embodiment of the invention only and not for purposes of limiting same, FIG. 1 shows an elongated hollow housing defining a splice case A for cables or the like. Splices in such linear elements as electrical or optical cables are enclosed within housing or splice case A for protection. Suitable end caps are sealingly applied to the splice case in a known manner around the cables.

Elongated housing or splice case A is formed by a pair of identical reversely positioned housing parts or splice case members B. Each housing part of splice case member B includes an arcuate main body portion 12 having opposite flanges 14 extending outwardly therefrom. Each flange 14 has an inner end portion adjacent its intersection 16 with main body portion 12, and an outer end portion adjacent outer terminal ends 18.

Figure 3:
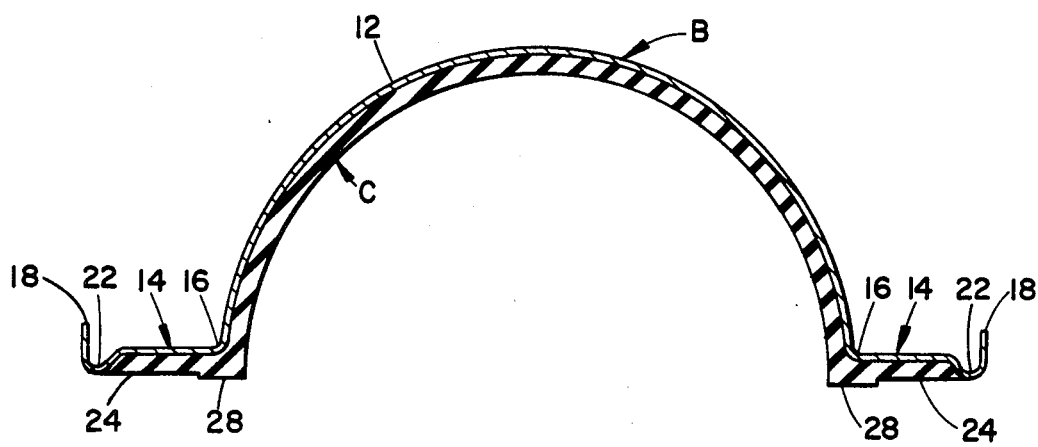
FIG. 3 is a cross-sectional elevational view of one splice case member which is used in cooperation with an identical splice case member to assemble the splice case of FIGS. 1 and 2.
Figure 4:
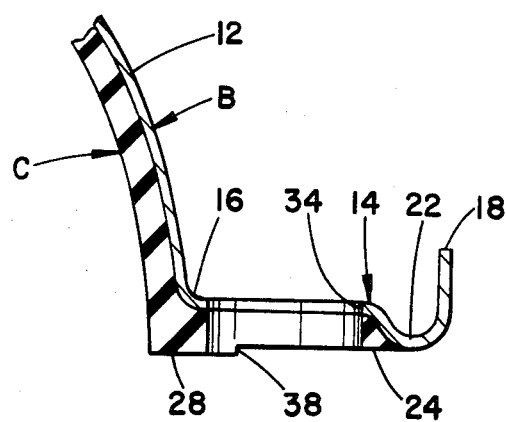
FIG. 4 is an enlarged cross-sectional elevational view of a flange on the splice case member of FIG. 3 showing the location of each bolt hole through the flanges relative to sealing areas thereon.

As best shown in FIGS. 3 and 4, each splice case member B is formed by an outer shell of rigid material such as stainless steel which is lined with an elastomeric material such as neoprene rubber C or the like bonded to the inner surface of the shell.

Each housing part or splice case member B has a longitudinally extending groove 22 adjacent the outer end portion of flange 14 thereof. Each longitudinal groove 22 is formed by reversely bending the outer metal shell into a generally U-shaped configuration as shown in FIGS. 3 and 4, with the outer terminal end 18 extending substantially above the plane of the upper surface of each flange 14.

Elastomeric material C has a substantially greater thickness at the inner end portions of flanges 14 adjacent their intersections 16 with main body portion 12 than along the remainder of each flange 14. In addition, the elastomeric material is substantially tangent to the inner surface of the shell material defining groove 22. The inner surfaces 24 of the elastomeric material extending along the main portions of oppositely extending flanges 14 on a housing part or splice case member B lie in a common plane. The areas of greater thickness of elastomeric material C at the inner end portions of flanges 14 adjacent their intersections 16 with a main body portion 12 define sealing areas 28 which are located in a common plane spaced outwardly from elastomeric material surfaces 24 along the remainder of flanges 14. Also, the depth of groove 22 plus the thickness of the shell material is equal to the thickness of elastomeric material C along the main portion of each flange 14 in the area of elastomeric material surfaces 24, while the thickness of elastomeric material C in sealing areas 28 is somewhat greater.

Each flange 14 has a plurality of fastener assembly holes 34 therethrough. As shown in FIG. 4, each fastener receiving hole 34 has a portion thereof extending through the area of flange 14 having the increased thickness of elastomeric material C thereon which define sealing areas 28, while the remainder of each hole 34 is outwardly of sealing area 28 as distinguished by its stepped shoulder 38 in FIG. 4 with respect to surface 24. In other words, each hole 34 has a portion thereof extending through each of sealing area 28 and remainder flange area 24. The portion of each hole 34 which extends through remainder flange sealing area 24 is preferably substantially greater than the portion thereof which extends through sealing area 28.

A pair of housing parts or splice case members B are reversely positioned in opposed relationship to form an elongated generally cylindrical hollow housing or splice case A. Obviously, the parts can be shaped so that the resulting housing or splice case has other than a cylindrical shape. When a pair of housing parts or splice case members B are reversely positioned in opposed relationship, flanges 14 on one splice case member are in opposed cooperating relationship with the flanges on the other housing part or splice case member to define cooperating pairs of flanges on opposite sides of the splice case adapted to be clamped together. A pair of splice case members B reversely positioned in opposed relationship have fastener receiving holes 34 in the opposed cooperating flange pairs aligned with one another.

Cooperating fastener strips D, E are positionable on opposite sides of each cooperating pair of flanges. Fastener assemblies F are used for clamping a cooperating pair of fastener strips D, E together and also for securely clamping together a cooperating pair of flanges 14 received therebetween.

Figure 5:
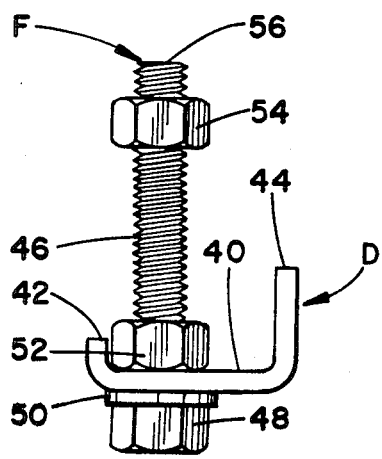
FIG. 5 is an end elevational view of one fastener strip used to assemble the splice case; and, FIG. 6 is a bottom plan view of a portion of another fastener strip used in cooperation with the fastener strip of FIG. 5 to assemble the splice case.

As best shown in FIG. 5, elongated rigid metal fastener strip D has a generally channel-shaped cross-section including a base web 40, and parallel inner and outer short and long legs 42, 44 extending perpendicular to base web 40. Outer leg 44 has a greater length than inner leg 42 by an amount approximately equal to the depth of flange groove 22 in FIGURE 4 as measured from the outer surface of flange 14 to the bottom of groove 22. Inner and outer legs 42, 44 are spaced apart from one another parallel to base web 40 a distance which is approximately the same as the distance from the center of flange groove 22 to a location adjacent the intersection 16 between the inner end portion of a flange 14 and a main body portion 12. Thus, when a fastener strip D is positioned against a flange 14, outer leg 44 has its outer end portion received in groove 22, while inner leg 42 is located closely adjacent intersection 16 between a flange 14 and a main body portion 12.

Fastener strip D has a plurality of suitable fastener receiving holes therethrough in the area of base web 40 equal in number to and located on common centers with holes 34 in a flange 14.

Fastener assemblies F are shown as bolt and nut assemblies, and it will be appreciated that the fastener assemblies may be of other types and arrangements. In the arrangement shown, the holes through base web 40 of fastener strip D are approximately the same diameter as, or just slightly greater than, the diameter of bolts 46. Bolts 46 are extended through the holes in base web 40 with bolt heads 48 located on the opposite side of base web 40 from legs 42, 44. A lock washer 50 is positioned between each bolt head 48 and the base web 40. An assembly nut 52 is threaded on each bolt 46 on the opposite side of base web 40 from bolt head 48. Bolt 46 and nut 52 are securely tightened for clamping base web 40 between bolt head 48 and assembly nut 52 so that all of the bolt and nut assemblies may be secured to a fastener strip D at the factory. The bolt and nut assemblies are located substantially closer to short inner leg 42 than to long outer leg 44. When hex nuts are used, one flat face of assembly nut 52 is closely adjacent to the inner surface of short inner leg 42 as shown in FIG. 5. Bolts 46 are substantially longer than legs 44 to extend through a cooperating pair of flanges 14 and a cooperating fastener strip E.

A clamping nut 54 is threaded on the outer end portion of each bolt 46 for use in clamping a pair of fastener strips together with a cooperating pair of flanges clamped therebetween. After clamping nuts 54 are threaded onto bolts 46 at the factory, bolts 46 may have the outer ends thereof staked as generally indicated at 56 or otherwise provided with means for preventing complete separation of clamping nuts 54 from bolts 46. Clamping nuts 54 and assembly nuts 52 are of the same size, and flange holes 34 are dimensioned for closely receiving same therethrough. In the arrangement shown and described, one end portion of bolts 46 is securely attached to a fastener strip D, while the opposite free end portions thereof have clamping nuts 54 thereon to define an enlargement. By way of example, it will be recognized that it would be possible to spot weld or otherwise secure nuts to base web 40 so that bolts 46 could be threaded therein to attach the bolts to fastener strip D, and bolt heads 48 would then be located in the place of nuts or enlargements 54. Thus, the enlargement 54 could be either a bolt head or a nut, or could be some other part when fastener assemblies of other types are used.

Fastener strip E has the same cross-sectional size and shape as fastener strip D, and its description will not be duplicated in great detail. Fastener strip E has a base web 60 with a short inner leg 62 and a long outer leg 64 extending therefrom in the same manner and spacing as described with respect to legs 42, 44 on fastener strip D. A plurality of generally keyhole-shaped fastener receiving openings 66 are formed through base web 60. Each keyhole-shaped opening 66 has a large portion 68 and an elongated portion 70 which is substantially narrower and extends longitudinally of fastener strip E from large portion 68.

Figure 6:
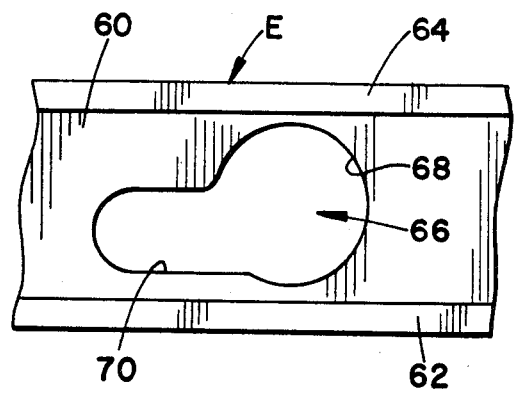

Large opening portions 68 are circular and of approximately the same size as holes 34 in flanges 14 so that enlargements 54 on fastener assemblies F may be freely extended therethrough. Openings 66 are equal in number to holes 34 in each flange 14, and large opening portions 68 are spaced on centers corresponding to the centers of holes 34. Narrow opening portions 70 extend longitudinally of fastener strip E from large opening portions 68, and are located substantially closer to short inner leg 62 than long outer leg 64. Thus, a substantially greater portion of large opening portion 68 is located on the side of narrow portion 70 toward long leg 64. In a preferred arrangement, the centers of large opening portions 68 are centered between the inner surfaces of legs 62, 64. Narrow area openings 70 are located such that the longitudinal axis of a bolt 46 received therein will be located approximately the same distance from the inner surface of leg 62 as it is located from the inner surface of leg 42 on fastener strip D. The width of narrow opening area 70 is approximately the same as, or just slightly greater than, the diameter of bolts 46 and the terminal ends of narrow portions 70 are smoothly curved as shown in FIG. 6. Generally keyhole-shaped openings 66 in fastener strip E are located such that when bolts 46 are located within narrow portions 70 and bottomed out against the curved ends thereof, the opposite terminal ends of fastener strip E and D are in alignment.

Housing or splice case A is assembled by positioning a pair of housing parts of splice case members B in opposed relationship with flanges 14 thereon forming opposed cooperating flange pairs on opposite sides of the housing or splice case. A fastener strip D is then manually manipulated to extend enlargements or nuts 54 through flange holes 34 until legs 42, 44 on fastener strip D engage the outer surface of an adjacent flange 14. The terminal end portion of long leg 44 will be located in a flange groove 22 and the terminal end of short leg 42 will engage a flange 14 adjacent the intersection 16 of such flange with a main body portion 12. Bolts 46 and enlargements or nuts 54 will then extend through the cooperating flange pair to the opposite side thereof from fastener strip D.

A fastener strip E is then manually manipulated for extending enlargements 54 through large area portions 68 of openings 66 until fastener strip E has its leg engaging the opposite flange of the cooperating flange pair. Fastener strip E is then shifted longitudinally of its length and parallel to the longitudinal axis of splice case A for positioning bolts 46 in narrow area portions 70 and to align enlargements or nuts 54 with narrow area portions 70. Enlargements or nuts 54, which will not pass through narrow area portions 70, are then tightened for securely clamping fastener strips D, E together with a cooperating pair of flanges securely clamped therebetween. Along leg 64 of fastener strip E is received in a groove 22 in a flange 14, while a short leg 62 is located closely adjacent the intersection 16 of such flange with a body portion 12.

When fastener strips D, E are positioned in opposed relationship on opposite sides of a cooperating flange pair, short legs 42, 62 are in aligned opposed relationship as are long legs 44, 64. Thus, a secure clamping force is achieved along the full length of the cooperating flange pair between legs 42, 62 and between legs 44, 64. Short legs 42, 62 are in alignment with sealing areas 28 of elastomeric material C so that a concentrated clamping force is exerted between legs 42, 62 in alignment with sealing areas 28 along the full length thereof. In addition, fastener assemblies F are located closer to short legs 42, 62 so that the clamping force is assured of being greatest along the full length of sealing areas 28. Location of legs 44, 64 in grooves 22 helps to position short legs 42, 62 in alignment with sealing areas 28, and helps to hold the fastener strips to the flanges during assembly and afterwards. In that regard, the width of a groove 22 is not substantially greater than the width of a long leg 44 or 64 so that a fastener strip D, E cannot move any significant amount transversely of its length once such legs are positioned in the grooves.

Figure 2:
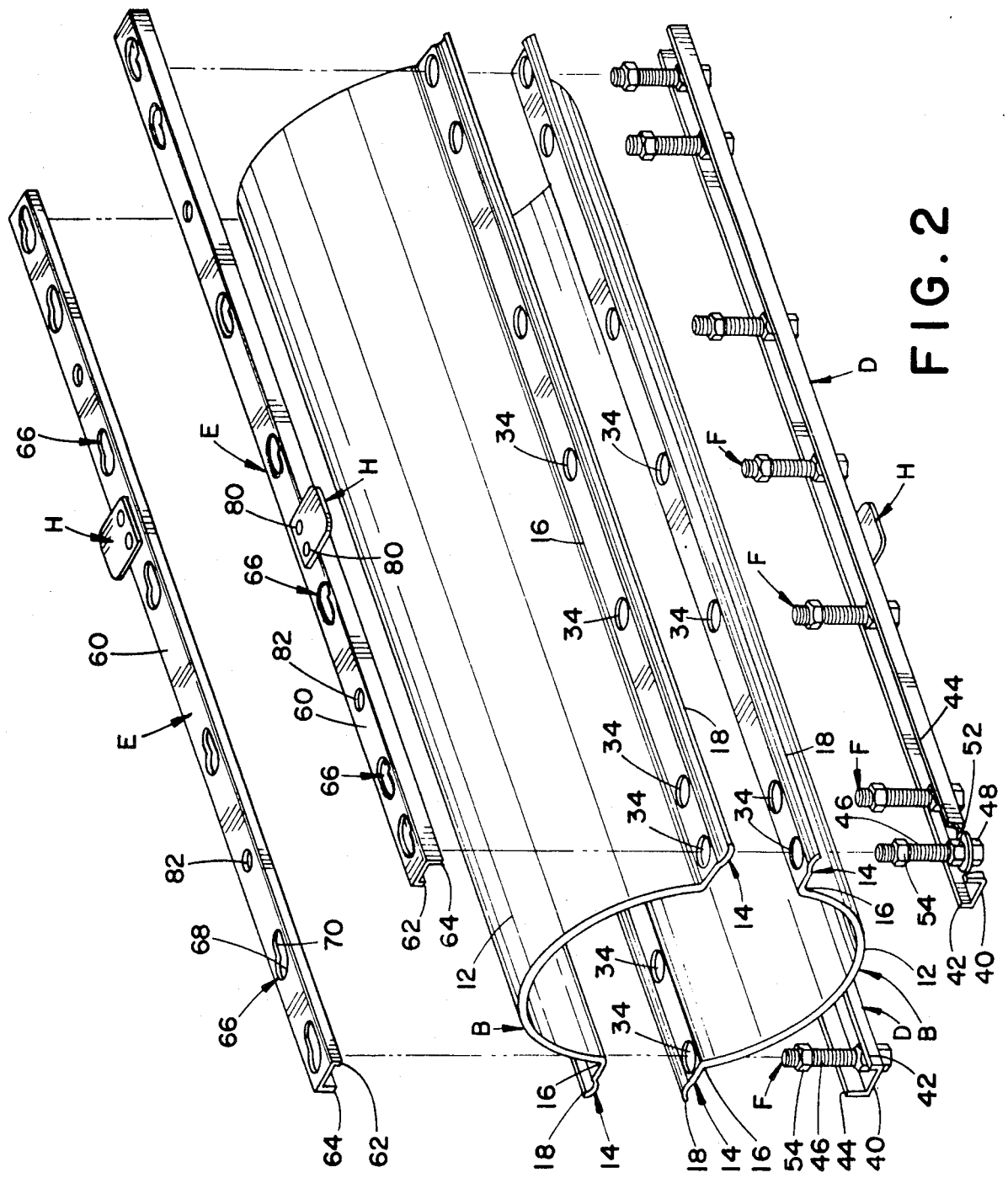
FIG. 2 is an exploded perspective view of the splice case of FIG. 1 with certain elastomeric material removed for clarity of illustration.

It will be recognized that nuts 54 may be loosened so that fastener strips E, D may be separated from housing or splice case A in the reverse procedure from assembly so that access may be gained to the interior thereof. Reassembly may then be accomplished as described. In the arrangement shown, manual manipulation members or handles H are suitably secured to base webs 40, 60 of fastener strips D, E on the opposite sides thereof from legs 42, 44 or 62, 64. These handles comprise flat members of suitable plastic or the like which extend outwardly from webs 40, 60 substantially parallel thereto and substantially past long legs 44, 64 thereof. Handles H are located intermediate the opposite ends of their fastener strips, and may be secured to such strips in any suitable manner as by screws 80 shown on fastener strip E in FIG. 2. Small holes 82 may be provided in fastener strip E as also shown in FIG. 2 for securing a grounding strap or a strand hanger thereto if so desired.

It will be recognized that the improved arrangements shown and described in the present application may be used for flanged joints in general, and that the fastener strips may have other applications. Also, it will be recognized that the improved assembly of the present application substantially reduces the number of loose parts required for clamping splice case flanges together as compared to arrangements which do not have assembled fastener strips. Likewise, this results in a substantial reduction in the time of assembly and disassembly because the number of parts a person must handle is substantially reduced. Bolt and nut assembly loads are more efficiently distributed along the sealing flange areas of the splice case to provide a more highly functional closing mechanism. Furthermore, the channel fastener strips provide substantially uniform loading along the length of the flanges between the channel legs to reduce flange distortion and thereby extend the life of the splice case.

Although the invention has been shown and described with respect to a certain preferred embodiment, modifications and alterations will occur to others skilled in the art upon a reading and understanding of this specification. It is intended to include all such modifications and alterations insofar as they come within the scope of the claims or the equivalents thereof.

Having thus described the invention, it is now claimed:

1. An elongated fastener strip of generally channel-shaped cross-section including a web having legs projecting from opposite side edges thereof in the same direction, one said leg having a projecting length from said web which is substantially shorter than the length of the other leg to define short and long legs, and generally keyhole-shaped slots in said web having large opening areas and narrow opening areas extending therefrom generally longitudinally of said strip.

2. The fastener strip as defined in claim 1 wherein at least said narrow opening areas of said generally keyhole-shaped openings are substantially closer to said short leg than to said long leg.

3. The fastener strip as defined in claim 2 wherein a substantially greater portion of said large opening area is located on the long leg side of said narrow opening area than on the short leg side thereof.

4. A fastener strip of generally channel-shaped cross-section including a web having legs projecting from opposite side edges thereof in the same direction, bolt and nut assemblies including bolts having one end portion thereof attached to said web and projecting therefrom in the same direction as said legs, said bolts having enlargements on the opposite end portions thereof in the form of a nut or bolt head, and said bolts being located substantially closer to one of said legs than to the other said leg.

5. The fastener strip as defined in claim 4 wherein said one leg has a projecting length from said web which is substantially shorter than the corresponding projecting length of said other leg.

6. The fastener strip as defined in claim 4 wherein said enlargement comprises a nut and said bolts extend through holes in said web, said bolts having enlarged heads positioned on the opposite side of said web from said legs, mounting nuts on said bolts on the opposite side of said web from said enlarged heads, and said web being clamped between said enlarged heads and said mounting nuts.

* * * * *